United States Patent [19]

Kittel

[11] Patent Number: 4,732,252
[45] Date of Patent: Mar. 22, 1988

[54] THRUST PLATE UNIT FOR A FRICTION CLUTCH

[75] Inventor: Friedrich Kittel, Schweinfurt, Fed. Rep. of Germany

[73] Assignee: Fichtel & Sachs AG, Schweinfurt

[21] Appl. No.: 869,100

[22] Filed: May 30, 1986

[30] Foreign Application Priority Data

Jun. 5, 1985 [DE] Fed. Rep. of Germany ....... 3520145

[51] Int. Cl.$^4$ ............................................. F16D 13/50
[52] U.S. Cl. ................................. 192/70.27; 192/89 B
[58] Field of Search ............................ 192/70.27, 89 B

[56] References Cited

U.S. PATENT DOCUMENTS

| | | | |
|---|---|---|---|
| 2,770,341 | 11/1956 | Wobrock. | |
| 3,283,864 | 11/1966 | Motsch | 192/89 B X |
| 3,595,355 | 7/1971 | Maucher et al. | 192/89 B X |
| 4,241,820 | 12/1980 | Ban et al. | 192/89 B |
| 4,491,211 | 1/1985 | Steeg | 192/89 B |

FOREIGN PATENT DOCUMENTS 1555408 9/1971 Fed. Rep. of Germany.

Primary Examiner—Carl D. Friedman
Attorney, Agent, or Firm—Toren, McGeady & Associates

[57] ABSTRACT

The thrust plate unit for a motor vehicle friction clutch comprises a clutch cover of annular pot form which comprises an annular face wall part and a side wall part standing axially away from the face wall part. An annular presser plate arranged in the clutch cover is guided nonrotatably but axially displaceably through several leaf springs on an annular retaining element arranged axially between a diaphragm spring and the presser plate. The retaining element for its part is secured through several axially protruding distance elements on the clutch cover. The retaining element and/or the distance elements at the same time fix the diaphragm spring on the clutch cover. The annular retaining element expediently extends within the external circumference of the diaphragm spring, so that the clutch cover can be constructed simply and stably with circular cross-section and without piercings.

4 Claims, 5 Drawing Figures

Fig. 4
Fig. 5
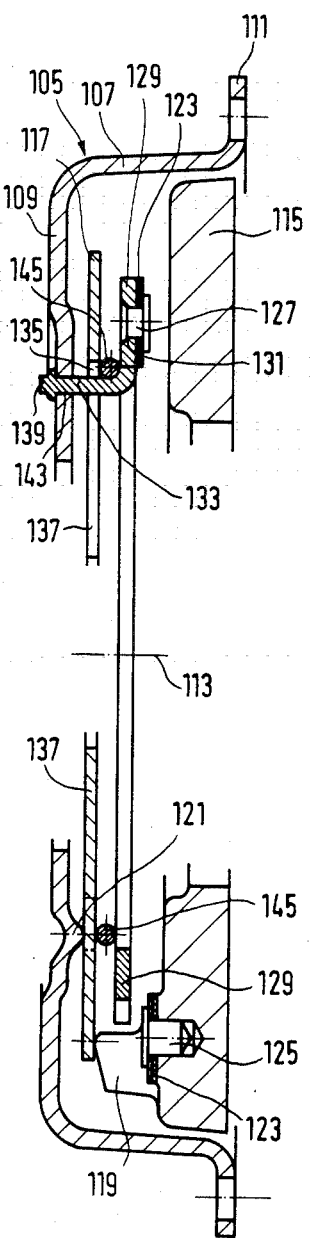
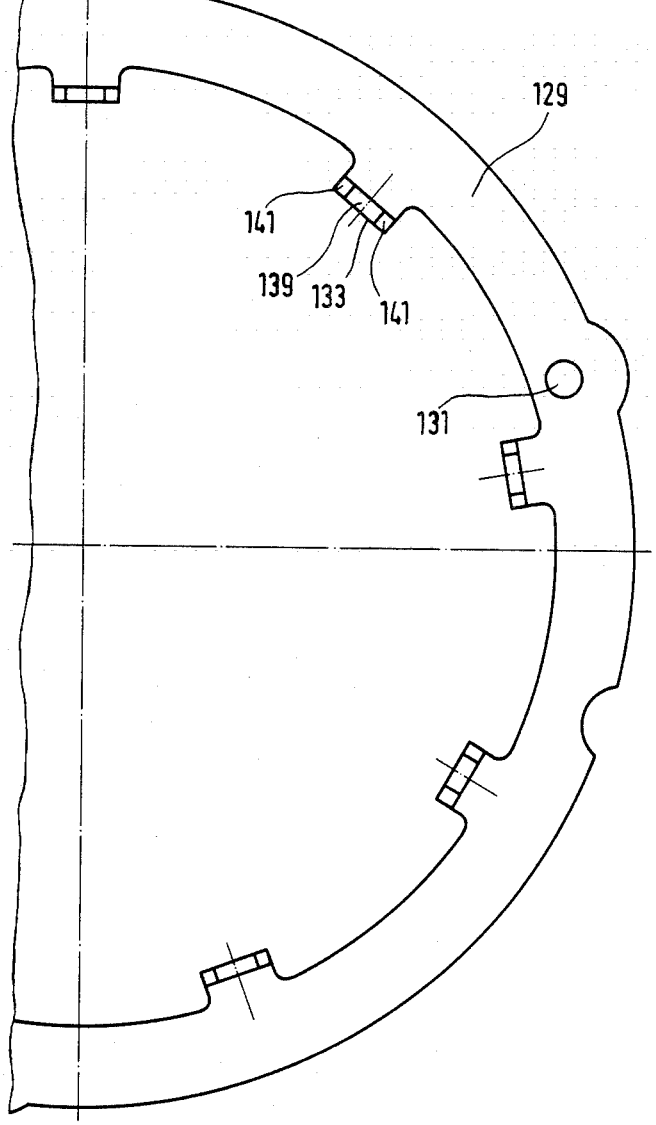

THRUST PLATE UNIT FOR A FRICTION CLUTCH

BACKGROUND OF THE INVENTION

The invention relates to a thrust plate unit for a friction clutch, especially for a motor vehicle.

Thrust plate units for conventional friction clutches have a clutch cover of approximately annular pot form which comprises an annular face wall part and a side wall part standing axially away from the face wall part. The side wall part is secured to the fly-wheel at its edge axially remote from the face wall part. The clutch cover encloses an annular presser plate and a diaphragm spring arranged axially between the face wall part of the clutch cover and the presser plate. The diaphragm spring is supported on a circle with a first diameter on the face wall part and on a circle with a second diameter on the presser plate and presses the presser plate, through a clutch disc, against the fly-wheel. The presser plate is guided non-rotatably but axially movably on the clutch cover through several approximately tangentially extending leaf springs distributed in the circumferential direction.

In conventional thrust plate units the leaf springs are secured by one end to radially outwardly protruding extensions of the presser plate. With their other end the leaf springs are secured to extensions of the clutch cover. The extensions of the presser plate protrude into recesses or domed-out portions of the side wall part. U.S. Pat. No. 2,770,341 shows examples of this for a pressed-type clutch and German Patent No. 1,555,408 examples for a pulled-type clutch.

In the known thrust plate units the clutch cover has a comparatively complicated form or openings are provided in the side wall parts which are detrimental to the stability of the clutch cover.

The invention improves the thrust plate unit of a friction clutch and provides a thrust plate unit having a comparatively simple and nevertheless stable clutch cover.

SUMMARY OF THE INVENTION

Within the scope of the invention the leaf springs which guide the presser plate on the clutch cover are secured on the clutch cover not directly but through an additional annular retaining element which is arranged between the diaphragm spring and the presser plate and is in turn secured through several distance elements to the face wall part of the clutch cover. The side wall part of the clutch cover can be made completely circular in cross-section in this way. No outward bulges or windows for the reception of the leaf springs are necessary. Rather the leaf springs are seated radially within the region covered by the presser plate and the clutch disc and preferably within the external diameter of the diaphragm spring. The presser plate preferably has no noses standing out radially beyond the circular contour of the side wall part of the clutch cover. The side wall part of the clutch cover therefore has no apertures or recesses or the like, so that the clutch cover used within the scope of the invention is stiffer than conventional clutch covers. With equal stiffness a thinner material can be used for the production of the clutch cover. Furthermore the invention renders possible a better exploitation of space of the clutch cover.

The retaining element is preferably an annular disc from which expediently integrally formed-on extensions protrude axially. The extensions can be arranged on the external circumference of the annular disc and at the same time guide the diaphragm spring radially on the clutch cover. Alternatively the extensions can also pass through openings, for example the slots between the spring tongues of the diaphragm springs, and in the last mentioned configuration the annular disc can be used at the same time for the axial supporting of the diaphragm spring.

The annular retaining element can consist of a single closed ring. However retaining elements consisting of several mutually separate segments can also be used. The segments preferably have like configuration. The production expense can be reduced by segmenting. The number of segments is expediently made equal to the number of the leaf springs.

The retaining element can be welded or otherwise secured to the clutch cover. It has proved advantageous if the distance elements are formed on integrally and further riveted to the face wall part.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 4 shows a partial axial longitudinal section through a thrust plate unit of a pressed-type friction clutch; and FIG. 5 shows a partial axial view of a retaining ring of the thrust plate unit according to FIG. 4.

DETAILED DESCRIPTION OF THE DRAWINGS

Figure 1:
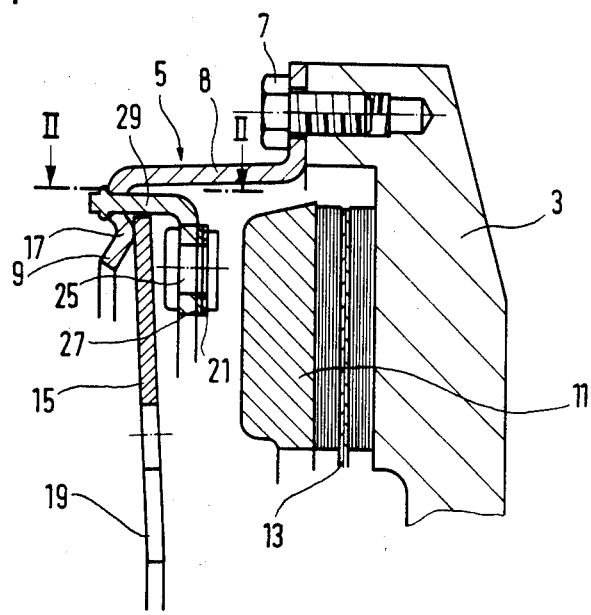
FIG. 1 shows a partial axial longitudinal section through a pulled-type friction clutch for a motor vehicle.
Figure 1:
Figure 1:
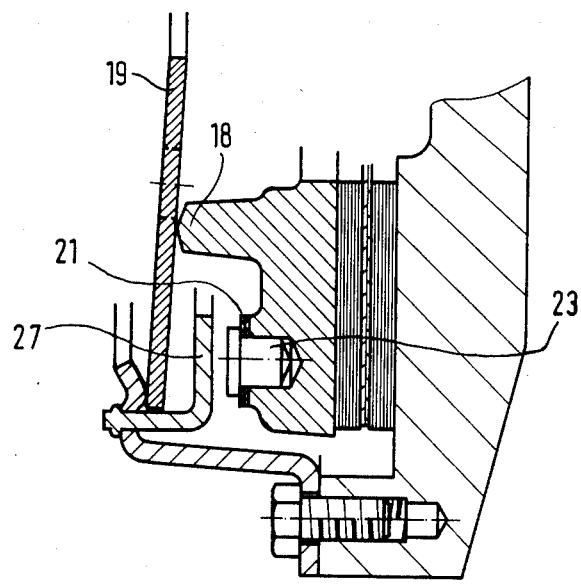
Figure 2:
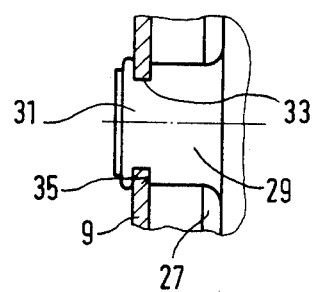
FIG. 2 shows a radial view of a distance element seen along a line II—II in FIG. 1.

FIGS. 1 and 2 show details of a pulled-type friction clutch for a motor vehicle. A clutch cover 5 is secured with screws 7 to a fly-wheel 3, rotatable about a rotation axis 1, of an internal combustion engine (not shown). The clutch cover 5 has substantially the form of an annular pot, the annularly closed side wall 8 of which merges on the side axially remote from the fly-wheel 3 into a radially inwardly protruding face wall part 9. The clutch cover 5 encloses a similarly annular presser plate 11. A clutch disc 13 is arranged in the usual way between the presser plate 11 and the fly-wheel 3. A diaphragm spring 15 is arranged axially between the presser plate 11 and the face wall part 9 and abuts in the region of its external circumference on an abutment bead 17 formed into the face wall part 9. From the presser plate 11 there protrude projections 18 on which the diaphragm spring 15 is supported in the region of a circle with smaller diameter than the diameter of the abutment bead 17. The diaphragm spring 15 is installed with initial stress and braces the presser plate 11 through the clutch disc 13 against the fly-wheel 3. Spring tongues 19 protruding inwards from the diaphragm spring 15 co-operate with a release system (not shown further). If the spring tongues 19 are drawn away from the fly-wheel 3, the presser plate 11 is relieved of load, whereby the clutch is disengaged.

The presser plate 11 is guided non-rotatably but axially movably on the clutch cover 5 through a plurality of leaf springs 21 distributed in the circumferential direction and extending approximately tangentially of the presser plate. The leaf springs 21, as shown in FIG. 1 in section by an upper and a lower leaf spring, are secured with their one end through blind hole rivets 23 to the presser plate 11 and with their other end by rivets 25 to a retaining ring 27 of annular disc form. The retaining ring 27 is arranged in a plane perpendicular to the axis 1 of rotation axially between the diaphragm spring 15 and the presser plate 11 in a region radially overlapped by the presser plate 11 and the clutch disc 13. As shown also by FIG. 2, extensions 29 of tab form protrude from the external circumference of the retaining ring 27 axially away to the face wall part 9. The extensions 29 narrow at the end adjacent to the face wall part 9 into a rivet extension 31 which passes through an opening 33 of the face wall part 9 and is secured by rivet deformation on the side of the face wall part 9 axially remote from the retaining ring 27. On the side of the face wall part 9 adjacent to the retaining ring 27 the extensions 29 widen, forming support shoulders 35 which are supported on the face wall part 9. The extensions 29 reach with close radial spacing past the external circumference of the diaphragm spring 15 and radially guide the diaphragm spring 15. Since the leaf springs 21 can be accommodated with the aid of the retaining ring 27 completely within the circle determined by the clutch disc 13, the clutch cover can have a simple form of circular cross-section without apertures or recesses or the like, thus the clutch cover is stiffer than in conventional clutches, or with equal stiffness it can be produced from thinner and thus more easily worked material. For an existing construction space the clutch cover can be exploited especially favorably, whereby clutch discs with comparatively large external diameter can be installed. Furthermore the securing of the clutch cover to the fly-wheel can be variably selected. Thus by way of example bayonet catches between these two parts are readily usable.

Figure 3:
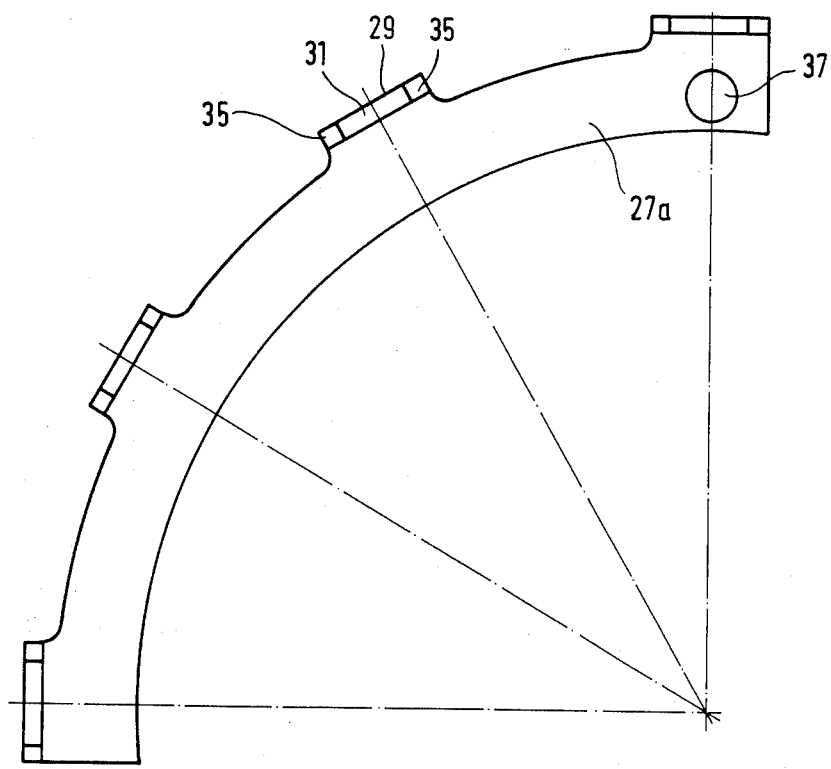
FIG. 3 shows an axial view of a retaining ring segment usable in the clutch according to FIG. 1.

The retaining ring 27 can be formed as an annularly closed, one-piece annular disc. FIG. 3 shows a variant of the retaining ring in which the retaining ring is assembled from a plurality of annular disc segments 27a, each of which comprises several of the extensions 29 and at least one opening 37 for the securing of the rivets 25. Its own segment 27a is expediently allocated to each of the leaf springs 21. The segments 27a as illustrated in FIG. 3 are suitable for a clutch having three leaf springs 21 offset by 120° in relation to one another in the circumferential direction. FIG. 3 further shows the arrangement of the abutment shoulders 35 in the circumferential direction on both sides of the rivet extension 31. The division of the retaining ring into segments 27a reduces the stamping waste in production.

FIG. 4 shows a thrust plate unit of a pressed-type friction clutch in which for the sake of simplicity the fly-wheel and the clutch disc are omitted. The thrust plate unit comprises a clutch cover 105 which has essentially the form of an annular pot and comprises a side wall part 107 of approximately circular cross-section and a face wall part 109. Axially oppositely to the face wall part 109 the clutch cover 105 carries a flange 111 for securing to the fly-wheel which is rotatable about a rotation axis 113. The clutch cover 105 encloses an annular presser plate 115. A diaphragm spring 117 is arranged axially between the presser plate 115 and the face wall part 109, which spring is supported in the region of its external circumference on axial projections 119 of the presser plate 115. The face wall part 109 has an abutment bead 121 for the counter-supporting of the diaphragm spring 117, along a circle having a diameter smaller than the circle of arrangement of the projections 119. The diaphragm spring 117 is installed under stress in such a way that it thrusts the presser plate 115 from the face wall part 109, through the clutch disc (not shown), against the fly-wheel. The presser plate 115 is guided non-rotatably but axially movably on the clutch cover 105 through several leaf springs 123 staggered in relation to one another in the circumferential direction. FIG. 4, similarly to FIG. 1, shows sections through an upper and a lower leaf spring 123 in order to clarify the securing of both ends. The one end of each leaf spring 123 is secured with a blind hole rivet 125 to the presser plate 115, while the other end in each case of each leaf spring 123 is secured by means of a rivet 127 to a retaining ring 129. The rivets 127 are here seated in holes 131 of the retaining ring 129. The retaining ring 129 extends substantially in a plane perpendicular to the rotation axis 113 axially between the diaphragm spring 117 and the presser plate 115. It is arranged substantially radially within the region defined by the external circumference of the diaphragm spring 117. From the internal circumference of the retaining ring 129, integrally formed-on extensions 133 protrude axially to the face wall part 109. The extensions 133 pass through foot openings 135 between adjacent, radially inwardly protruding spring tongues 137 of the diaphragms spring. The foot openings 135 are extensions of the slots which separate the spring tongues 137 from one another in the circumferential direction. The end of each extension 133 axially remote from the retaining ring 129 carries a rivet projection 139 which merges in the circumferential direction of the ring on both sides into abutment shoulders 141. The rivet projections 139 of the extensions 133 pass through openings 143 of the face wall part 109 and are deformed into rivet heads on the side axially remote from the retaining ring 129, which hold the retaining ring 129 fixed between themselves and the abutment shoulders 141. Axially between the retaining ring 129 and the diaphragm spring 117 an abutment ring 145 is arranged on the diameter of the abutment bead 121. The abutment ring 145 commonly encloses the extensions 133 and is guided radially on the extensions 133. The abutment ring 145 forms the tilt bearing, effective in the opposite direction, of the diaphragm spring 117 to which the diaphragm spring 117 changes over when its spring tongues 137 are moved axially towards the presser plate 115 for the disengagement of the clutch.

The advantages stated above for the pulled-type clutch result for the pressed-type clutch. Furthermore the retaining ring 129 can likewise consist of several segments, as explained with reference to FIG. 3. Here again the number of segments preferably corresponds to the number of leaf springs.

While specific embodiments of the invention have been shown and described in detail to illustrate the application of the inventive principles, it will be understood that the invention may be embodied otherwise without departing from such principles.

What I claim is:

1. A thrust plate unit for a friction clutch having a rotation axis comprising:
   (a) a clutch cover of unitary annular pot from which comprises an annular face wall part extending transversely of the rotation axis and having a circumferentially extending inner edge and a circumferentially extending outer edge and a side wall part extending from the outer edge of said face wall part generally parallel to the rotation axis away from the face wall part with the side wall part being free of open spaces,
   (b) an annular presser plate arranged within and spaced radially inwardly from the side wall part of the clutch cover and encircling the rotation axis,
   (c) a diaphragm spring arranged in the rotation axis direction between the face wall part and the presser plate, which spring abuts on a circle with a first diameter on the face wall part and on a circle with a second diameter on the presser plate,
   (d) several separate leaf springs staggered in relation to one another in the circumferential direction of the presser plate each having a first and a second end, with each first end connected to the presser plate for guiding the presser plate non-rotatably but axially movably relative to the rotation axis on the clutch cover,
   (e) an annular retaining element encircling the rotation axis and arranged axially between the diaphragm spring and the presser plate, which element is secured to the face wall part of the clutch cover through several distance elements staggered in relation to one another in the circumferential direction of the retaining element and on which element said second end of each leaf spring is secured,
   (f) said retaining element has the form of an annular disc and wherein the distance elements are made as axial extensions of and are located in the region of the internal circumference of the annular disc, which extensions pass axially through openings in the diaphragm spring and are connected firmly by their ends remote from the annular disc with the face wall part of the clutch cover, the diaphragm spring is supported axially between the face wall part of the clutch cover and the annular disc, and
   (g) a support ring is arranged axially between and in contact with the diaphragm spring and the annular disc and wherein the extensions radially center the support ring.

2. A thrust plate unit according to claim 1, wherein the diaphragm spring has radially inwardly protruding spring tongues and wherein the extensions pass through the diaphragm spring between the spring tongues.

3. A thrust plate unit according to claim 1, wherein the distance elements are riveted with the face wall part.

4. A thrust plate unit according to claim 3, wherein the distance elements comprise abutment shoulders pointing axially to the face wall part laterally of rivet extensions passing through openings of the face wall part.

* * * * *